(12) United States Patent
Li et al.

(10) Patent No.: US 8,572,973 B2
(45) Date of Patent: Nov. 5, 2013

(54) APPARATUS AND METHOD FOR GENERATING POWER AND REFRIGERATION FROM LOW-GRADE HEAT

(75) Inventors: Heng-Yi Li, New Taipei (TW); How-Ming Lee, Taoyuan County (TW); Chin-Ching Tzeng, New Taipei (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 281 days.

(21) Appl. No.: 13/083,703

(22) Filed: Apr. 11, 2011

(65) Prior Publication Data
US 2012/0255304 A1    Oct. 11, 2012

(51) Int. Cl.
*F01K 25/00*    (2006.01)

(52) U.S. Cl.
USPC ............... 60/671; 60/670; 60/650; 62/500

(58) Field of Classification Search
USPC ........... 60/659, 670, 671, 676, 680, 682, 649, 60/651; 62/331, 191, 500
See application file for complete search history.

(56) References Cited

U.S. PATENT DOCUMENTS

| | | | | |
|---|---|---|---|---|
| 3,277,660 A * | 10/1966 | Kemper et al. | ............... | 62/116 |
| 4,523,437 A * | 6/1985 | Briley | ............... | 62/238.4 |
| 6,892,522 B2 * | 5/2005 | Brasz et al. | ............... | 60/39.181 |
| 6,981,377 B2 * | 1/2006 | Vaynberg et al. | ............... | 60/641.8 |
| 8,245,491 B2 * | 8/2012 | Horek et al. | ............... | 60/39.182 |

* cited by examiner

*Primary Examiner* — Kenneth Bomberg
*Assistant Examiner* — Wesley Harris
(74) *Attorney, Agent, or Firm* — Jackson IPG PLLC

(57) ABSTRACT

An apparatus and a method generate power and refrigeration from low-grade heat. The apparatus includes a heating module, a power generator module, an ejector, a heat exchanger, a condenser module, a low-temperature evaporator, a reservoir, a pressure pump and two direction controllable three-way valves. The heating module includes a heat source and a boiler. The power generator module includes an expansion turbine and a power generator. The condenser module includes a condenser and a cooling tower. The method is that the direction controllable three-way valves are operated to change the flow directions of the working fluid for executing a power generation and refrigeration mode, a power generation mode, a refrigeration mode or an idle mode.

9 Claims, 4 Drawing Sheets

APPARATUS AND METHOD FOR GENERATING POWER AND REFRIGERATION FROM LOW-GRADE HEAT

BACKGROUND OF INVENTION

1. Field of Invention

The present invention relates to an apparatus and method for generating power and refrigeration simultaneously, more particularly, to an apparatus and method for generating power and refrigeration from low-grade heat.

2. Related Prior Art

As the technology advances and the global population grows, the demand for energy increases considerably. Excessive consumption of fossil fuel exhausts a huge amount of carbon dioxide that results in the green house effect that entails radical changes in the global weather. Hence, it has become a big challenge to the world to solve problems related to lack of energy resources and excessiveness of carbon dioxide, the green house gas. To solve these problems, there are two approaches, i.e., use of recyclable energy and reduction of the consumption of the fossil fuel. Regarding the effective use of the fossil fuel, efforts were made to reduce the consumption of the fossil fuel and increase conversion efficiencies in the past. Now, the recycling of waste heat seems promising because conversion technology has made a lot of progress.

High-grade waste heat, higher than 500° C., is recycled by combined cycle power generation or combined heat and power ("CHP") for example. For low-grade waste heat that is often a byproduct of melting, drying, thermal treatment, vaporizing and combustion, there however has not been any economic and effective heat-recycling method. In general, the low-grade waste heat cannot directly be converted to another form for use in a factory or power plant, and is therefore directly released to the environment, with a few exceptions where it is recycled by heat exchangers or recuperators. The heat exchangers and recuperators must be carefully designed so that they can be compatible with the processes of production, and the low-grade waste heat can only be recycled and reused as heat.

Thus, an alternative, i.e., an organic Rankine cycle system is widely used to convert low-grade heat to high-grade energy, i.e., electricity power. The organic Rankine cycle system is the Rankine thermodynamic cycle which uses organic working fluid to generate electricity power. The Rankine cycle has been used in conventional steam power plants and steam engines for many years and is sometimes referred as a practical Carnot cycle undergoing working fluid phase change. The grade of ordinary waste heat is however too low to use the steam Rankine cycle for the electricity power generation. Therefore, water is replaced with another working fluid such as an organic solvent, and an organic Rankine cycle is formed to convert low-temperature waste heat to electricity power. Furthermore, a power plant based on the organic Rankine cycle could be developed to convert industrial waste heat, geothermal heat or even solar thermal heat to electricity power.

According to statistics made by Taiwan Power Company in the year of 2005, the consumption of electricity in residential areas is about 20% of the total consumption of electricity in Taiwan, and the consumption of electricity in commercial areas is about 11% of the total consumption of electricity in Taiwan. Most of the energy is consumed to provide air-conditioning and illumination in the residential and commercial areas. Therefore, conversion of low-grade heat to electricity and refrigeration is useful in solving the problems related to the lack of energy sources and the excessiveness of the green house gas.

Referring to FIG. 3, there is shown a conventional organic Rankine cycle apparatus 2 for recycling low-grade heat such as industrial waste heat, solar thermal energy and geothermal energy. The conventional organic Rankine cycle apparatus 2 includes a heating module 20, a power generator module 21, a condenser module 22 and a pressure pump 23. The heating module 20 includes a boiler 201 and a heat source 202. The heat source 202 is a source of low-grade heat such as industrial waste heat, solar thermal heat or geothermal heat. The power generator module 21 includes an expansion turbine 211 coupled to a power generator 212. The condenser module 22 includes a condenser 221 and a cooling tower 222. The boiler 201 is in connection with the expansion turbine 211. The expansion turbine 211 is in connection with the condenser 221. The condenser 221 is in connection with the pressure pump 23. The pressure pump 23 is in connection with the boiler 201. A working fluid is circulating in the conventional organic Rankine cycle apparatus 2. The working fluid may be an organic hydrocarbon, a small molecular inorganic compound (such as $CO_2$ and $NH_3$) or a chlorofluorocarbon. The heat source 202 provides the low-grade heat to the boiler 201 so that the boiler 201 vaporizes the liquid working fluid at constant pressure. With the vaporized working fluid expanding, the expansion turbine 211 drives the power generator 212 to generate electricity. Then, the vaporized working fluid pressure is turned from high to low. The cooling tower 222 sends a coolant such as water to the condenser 221 to condense the low-pressure vaporized working fluid to liquid constant pressure. The pressure pump 23 pressurizes the working fluid to the boiler 201 from the condenser 221. Thus, the conventional organic Rankine cycle apparatus 2 converts the low-grade heat to the electricity power. However, the conversion ratio is low. In addition, the conventional organic Rankine cycle apparatus 2 can only convert low-grade heat to electricity power.

To increase the conversion efficiency, another conventional organic Rankine cycle apparatus 3 has been disclosed referring to FIG. 4. The conventional organic Rankine cycle apparatus 3 includes an evaporator module 30, a power generator module 31, a condenser module 32, a pressure pump module 33 and a mixer 34. The evaporator module 30 includes three heat exchangers 301. The power generator module 31 includes two turbines 311 coupled to one power generator together. The pressure pump module 33 includes two pressure pumps 331. Thus, the conventional organic Rankine cycle apparatus 3 which becomes a single-loop multi-pressure system with circulated working fluid is able to reduce the irreversibility of the heat source and the system. With the mixer 34, superheated working fluid can be fully used so that the utilization efficiency and thermal efficiency are increased. The conventional organic Rankine cycle apparatus 3 however can only convert low-grade heat to electricity.

The present invention is therefore intended to obviate or at least alleviate the problems encountered in prior art.

SUMMARY OF INVENTION

It is the primary objective of the present invention to provide an apparatus and method for executing a power generation and refrigeration mode, a power generation mode, a refrigeration mode and an idle mode, from low-grade heat.

To achieve the foregoing objective, the apparatus includes a heating module, a power generator module, an ejector, a heat exchanger, a condenser module, a throttle, a low-temperature evaporator, a reservoir, a pressure pump and two direction controllable three-way valves. The heating module includes a boiler and a heat source for energizing the boiler to vaporize liquid working fluid to high-temperature and high-pressure gaseous state. The power generator module includes an expansion turbine connecting the boiler and the ejector, and a power generator coupled to the expansion turbine. Thus, the high-temperature and high-pressure gaseous working fluid leaves from the boiler into the expansion turbine to drive the power generator for generating electricity and then become medium-temperature and medium-pressure gaseous working fluid. The medium-temperature and medium-pressure gaseous working fluid leaves from the expansion turbine and enters the ejector inlet to accelerate and become a low-pressure supersonic stream at the nozzle. The ejector includes a nozzle, a mixing section, a constant area section, a diffuser section, a suction port, an inlet and an outlet. The low-pressure supersonic stream then produces a high vacuum at the mixing section and sucks the low-pressure gaseous working fluid from the low-temperature evaporator through the suction port. Two streams mix together and become a supersonic mixed stream at the mixing section, and then enter the constant area section. When going through the constant area section, a normal shock wave occurs, accompanied by a significant pressure rise. After the shock, the velocity of the mixed stream becomes subsonic and decelerated at the diffuser section, and then is out of the ejector outlet. The hot channel of the heat exchanger is connected to the ejector outlet and the condenser inlet so that the mixed gaseous working fluid out of ejector is pre-cooled at the heat exchanger and then enters the condenser module. The condenser module includes a condenser and a cooling tower. The cooling tower is used to cycle a coolant through the condenser for removing the gaseous working fluid heat and condensing the gas to liquid. Moreover, the condenser is connected to the low-temperature evaporator through a throttle so that a portion of the liquid working fluid travels from the condenser to the low-temperature evaporator. In the low-temperature evaporator, the liquid working fluid absorbs heat, is vaporized, provides refrigeration, and becomes low-temperature and low-pressure gaseous working fluid, and to the ejector suction port. In addition to throttle, the reservoir is also connected to the condenser for receiving the other portion of the liquid working fluid from the condenser. The pressure pump is connected to the reservoir and heat exchanger. It pressurizes and pumps the liquid working fluid to the boiler through the heat exchanger, so that the liquid working fluid gets heated and vaporized again. Moreover, the mixed gaseous working fluid from the ejector could preheat the liquid working fluid from the pressure pump so that the loads of the heating module and the condenser module are reduced. The first direction controllable three-way valve is connected between the boiler and the expansion turbine. The second direction controllable three-way valve is connected between the expansion turbine and the heat exchanger. The method is that the first and second direction controllable three-way valves are operated to change the flow directions of the working fluid for executing a power generation and refrigeration mode, a refrigeration mode, a power generation mode or an idle mode.

Other objectives, advantages and features of the present invention will be apparent from the following description referring to the attached drawings.

BRIEF DESCRIPTION OF DRAWINGS

The present invention will be described through detailed illustration of the preferred embodiment versus the prior art referring to the drawings wherein.

DETAILED DESCRIPTION OF PREFERRED EMBODIMENT

Figure 1:
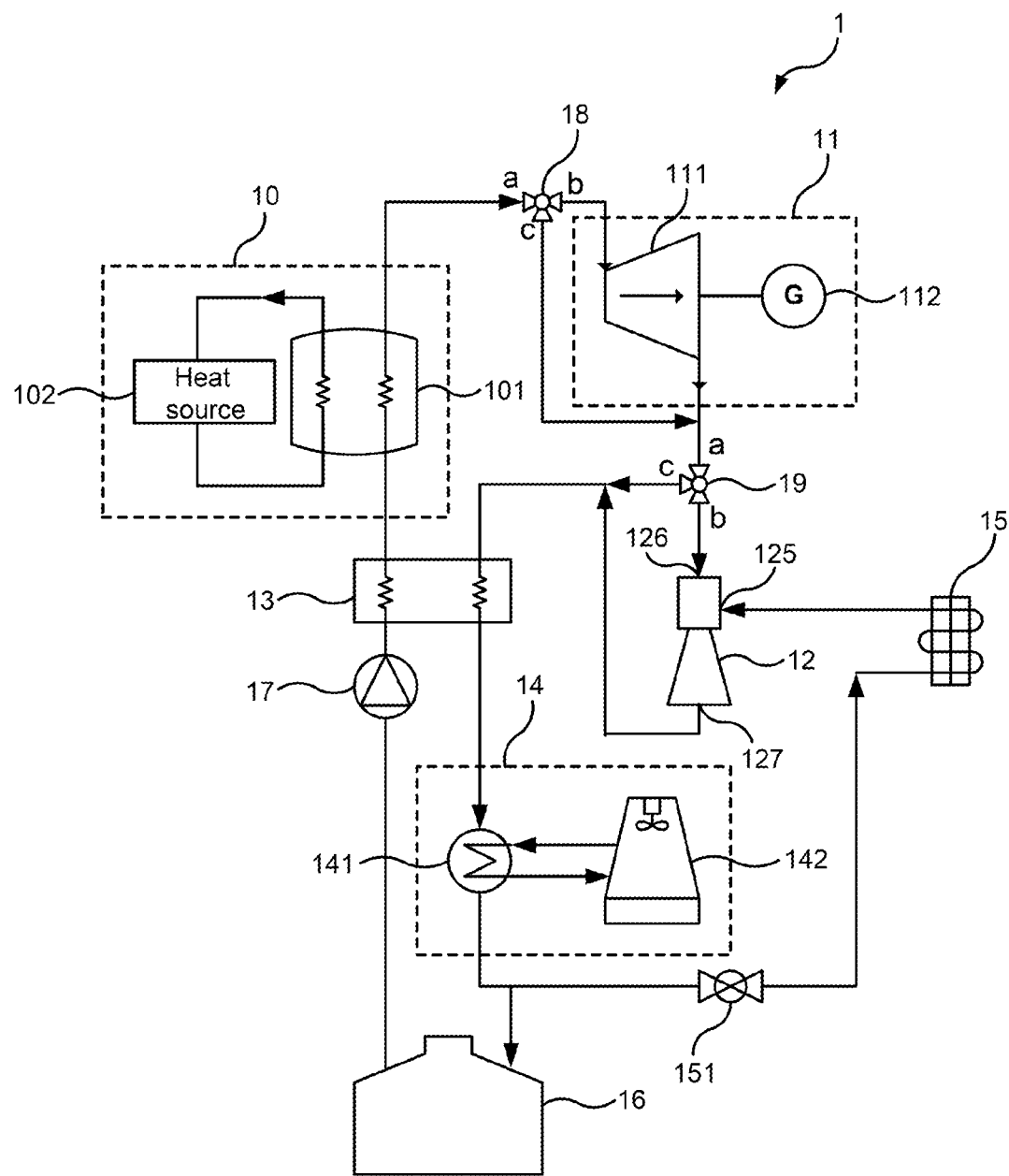
FIG. 1 is a block diagram of a power and refrigeration generating apparatus according to the preferred embodiment of the present invention.

Referring to FIG. 1, an apparatus 1 for generating power and refrigeration from low grade heat according to the preferred embodiment of the present invention is shown. The apparatus 1 includes a heating module 10, a power generator module 11, an ejector 12, a heat exchanger 13, a condenser module 14, a low-temperature evaporator 15, a reservoir 16, a pressure pump 17 and two direction controllable three-way valves 18 and 19. The working fluid directions could be changed by user with the two controllable three-way valves according to the demands of electric power and cooling for switching the operation mode to one of the four modes: power and refrigeration, refrigeration, power, and idle modes. Thus, the low-grade heat can be utilized in multiple manners so that the energy is saved, and the exhaust of carbon dioxide, the green house gas is reduced. The working fluid may be an organic hydrocarbon, a small molecular inorganic compound or a chlorofluorocarbon. The inorganic small molecular compound may be $CO_2$ or $NH_3$.

The heating module 10 includes a boiler 101 and a heat source 102. The heat source 102 may be industrial waste heat, solar thermal heat or geothermal heat.

The power generator module 11 includes an expansion turbine 111 and a power generator 112. The inlet of the expansion turbine 111 is connected to the outlet of the boiler 101.

Figure 2:
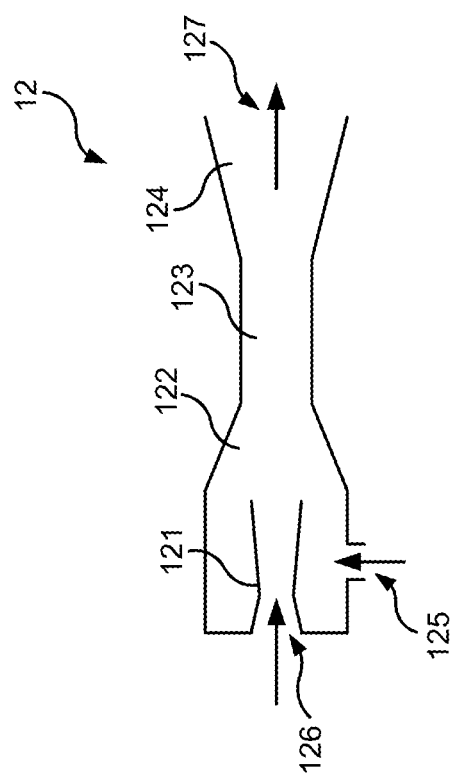
FIG. 2 is a cross-sectional view of an ejector of a power and refrigeration generating apparatus shown in FIG. 1.
Figure 3:
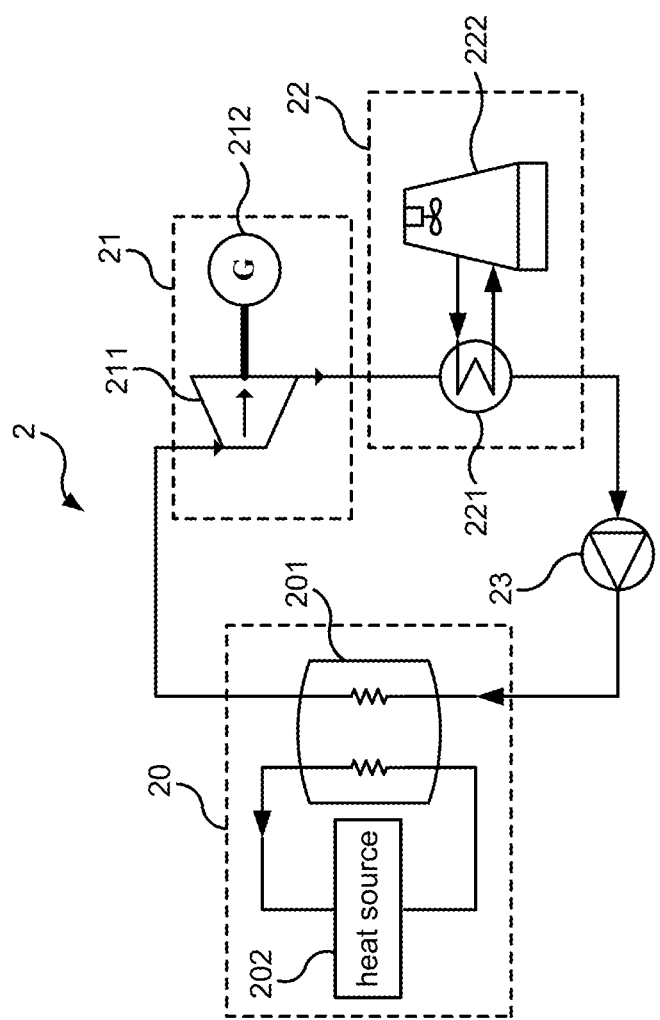
FIG. 3 is a block diagram of a first conventional organic Rankine cycle apparatus.
Figure 4:
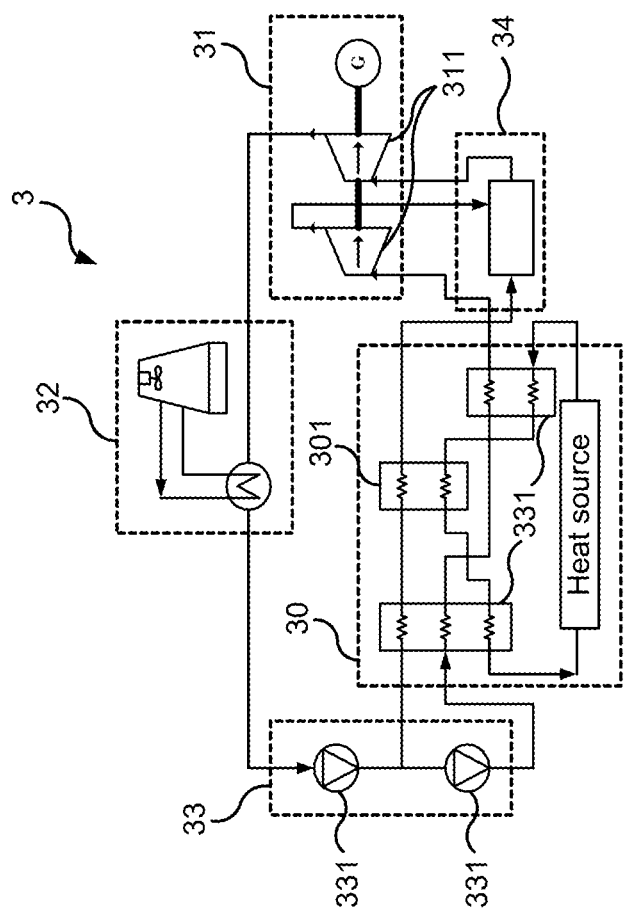
FIG. 4 is a block diagram of a second conventional organic Rankine cycle apparatus.

Referring to FIG. 2, the ejector 12 includes a nozzle 121, a mixing section 122, a constant area section 123, a diffuser section 124, a suction port 125, an inlet 126, and an outlet 127. The inlet 126 of the ejector 12 is connected to the outlet of the expansion turbine 111 of the power generator module 11. The ejector 12 which works as gas compressor is based on compressible fluid mechanics of higher pressure vaporized working fluid, not based on a mechanical device. Therefore, the ejector 12 is a thermally derived gas compressor that utilizes higher pressure vaporized working fluid to compress gas, and is reliable for not containing any mechanical parts.

The heat exchanger 13 has two channels: hot channel and cold channel. The hot channel inlet of the heat exchanger 13 is connected to the ejector outlet 127. The hot channel outlet of the heat exchanger 13 is connected to the condenser module 14.

The condenser module 14 includes a condenser 141 and a cooling tower 142. The inlet of the condenser 141 is connected to the hot channel outlet of the heat exchanger 13.

The inlet of the low-temperature evaporator 15 is connected to the outlet of the condenser 141 through a throttle 151. The outlet of the low-temperature evaporator 15 is connected to the suction port 125 of the ejector 12.

In addition to the throttle 151, the inlet of the reservoir 16 is also connected to the outlet of the condenser 141.

The inlet of the pressure pump 17 is connected to the outlet of the condenser 141 through the reservoir 16. The outlet of the pressure pump 17 is connected to the inlet of the boiler 101 through the cold channel of heat exchanger 13.

The direction controllable three-way valves 18 and 19 are operated to direct the working fluid in a selected one of various directions to execute a power generation and refrigeration mode, a refrigeration mode, a power generation mode or an idle mode. The first direction controllable three-way valve 18 is located between the boiler 101 and the expansion turbine 111. The second direction controllable three-way valve 19 is located between the expansion turbine 111 and the ejector 12. The first direction controllable three-way valve 18 is used to receive the gaseous working fluid from the outlet of the boiler 101 and direct the gaseous working fluid to the expansion turbine 111 or the second direction controllable three-way valve 19. The second direction controllable three-way valve 19 is used to receive the gaseous working fluid from the power generator module 11 or the first direction controllable three-way valve 18 and direct the gaseous working fluid to the ejector 12 or the heat exchanger 13.

The method for operating the apparatus is as follows:

In the power generation and refrigeration mode, each of the direction controllable three-way valves 18 and 19 is controlled so that the working fluid travels along a path a-b therein. The first direction controllable three-way valve 18 directs the gaseous working fluid to the expansion turbine 111 while the second direction controllable three-way valve 19 directs the gaseous working fluid to the ejector 12.

In the heating module 10, the heat source 102 energizes the boiler 101 to heat and vaporize the liquid working fluid to the high-pressure and high-temperature state. The high-pressure and high-temperature gaseous working fluid leaves from the boiler 101 into the expansion turbine 111 along the path a-b in the first direction controllable three-way valve 18. In the expansion turbine 111, the high-temperature and high-pressure gaseous working fluid drives the power generator 112 to generate electricity power and then becomes medium-temperature and medium-pressure gaseous working fluid.

Then, the medium-temperature and medium-pressure gaseous working fluid leaves from the expansion turbine 111 into the ejector 12 along the path a-b in the second direction controllable three-way valve 19. The medium-temperature and medium-pressure gaseous working fluid enters the ejector inlet 126. While going through the ejector 12, the medium-temperature and medium-pressure gaseous working fluid accelerates and becomes a low-pressure supersonic stream at the nozzle 121.

Thereafter, the low-pressure supersonic stream produces a high vacuum at the mixing section 122 and sucks the low-pressure gaseous working fluid from the low-temperature evaporator 15 through the suction port 125. The two streams mix together and become a supersonic mixed stream at the mixing section 122, and then enter the constant area section 123. When going through the constant area section 123, a normal shock wave occurs, accompanied by a significant pressure rise. After the shock, the velocity of the mixed stream becomes subsonic and decelerates at the diffuser section 124, and then out of ejector outlet 127. Thus, the low-pressure gaseous working fluid is introduced to the medium-temperature and medium-pressure gaseous working fluid and compressed to subsonic mixed gas at the outlet 127.

The subsonic mixed gaseous working fluid leaves from the ejector 12 into the hot channel of heat exchanger 13. Residual heat is recovered by preheating the liquid working fluid out of the pressure pump 17 so that the loads on the heating module 10 and the condenser module 14 are reducing, respectively.

After going through heat exchanger 13, the gaseous working fluid enters the condenser 141. A coolant such as water cycled by the cooling tower 142 to the condenser 141 where the gaseous working fluid is condensed to liquid. A portion of the liquid working fluid enters the low-temperature evaporator 15 through the throttle 151. In the low-temperature evaporator 15, this portion of the liquid working fluid absorbs heat and is vaporized to low-pressure gaseous working fluid, thus refrigeration is provided. The other portion of the liquid working fluid travels from the condenser 141 to the reservoir 16, thus providing sufficient liquid working fluid in the reservoir 16 so that the pressure pump 17 can be operated normally without suffering damages. The liquid working fluid is pressurized and pumped by the pressure pump 17 through the cold channel of heat exchanger 13 to the heating module 10 for heating and vaporizing. Thus, a thermodynamic cycle is completed, and power generation and refrigeration are conducted.

In the refrigeration mode, the first direction controllable three-way valve 18 is controlled so that the working fluid travels along another path a-c therein while the second direction controllable three-way valve 19 is controlled so that the working fluid travels along the path a-b therein. The first direction controllable three-way valve 18 directs the gaseous working fluid to the second direction controllable three-way valve 19 and the second direction controllable three-way valve 19 directs the gaseous working fluid to the ejector 12. Thus, the gaseous working fluid travels from the boiler 101 into the path a-c in the first direction controllable three-way valve 18, bypassing the power generator module 11. Then, the gaseous working fluid leaves from the first direction controllable three-way valve 18 into the ejector 12 along the path a-b in the second direction controllable three-way valve 19. The operation of the ejector 12 is mentioned above and will not be described again. The working fluid leaves from the heat exchanger 13 to the condenser module 14. Some of the working fluid enters the low-temperature evaporator 15 for refrigeration. The pressure pump 17 pressurizes and pumps the other liquid working fluid back to the heating module 10. Thus, the conversion apparatus 1 is operated in the refrigeration mode.

In the power generation mode, the first direction controllable three-way valve 18 is controlled so that the working fluid travels along the path a-b therein while the second direction controllable three-way valve 19 is controlled so that the working fluid travels along a path a-c therein. The first direction controllable three-way valve 18 directs the gaseous working fluid to the expansion turbine 111 while the second direction controllable three-way valve 19 directs the gaseous working fluid to the heat changer 13 and the condenser 141. Thus, along the path a-b in the first direction controllable three-way valve 18, the gaseous working fluid leaves from the boiler 101 to the expansion turbine 111 to generate electricity. Then, the medium-temperature and medium-pressure gaseous working fluid leaves from the expansion turbine 111 to the heat exchanger 13 along the path a-c in the second direction controllable three-way valve 19, bypassing the ejector 12. Then, the medium-temperature and medium-pressure gaseous working fluid leaves from the heat exchanger 13 to the condenser 141. The rest portion of the power generation is like in the power generation and refrigeration mode. Through the pressure pump 17, the liquid working fluid returns to the boiler 101, thus completing the power generation mode in which the conversion apparatus 1 is used to generate electricity only.

In the idle mode, each of the direction controllable three-way valves 18 and 19 is controlled so that the working fluid travels along the path a-c therein. The first direction controllable three-way valve 18 directs the gaseous working fluid to the second direction controllable three-way valve 19 while the second direction controllable three-way valve 19 directs the gaseous working fluid to the condenser 141. Thus, the gaseous working fluid travels from the boiler 101 into the path a-c in the first direction controllable three-way valve 18, by passing the power generator module 11. Then, the gaseous working fluid travels from the first direction controllable three-way valve 18 into the path a-c in the second direction controllable three-way valve 19, by passing the ejector 12. Then, the gaseous working fluid travels from the hot channel of the heat exchanger 13 to the condenser module 14. The rest portion of the idle mode is like in the power generation and refrigeration mode. The pressure pump 17 pressurizes and pumps the liquid working fluid back to the boiler 101 through the cold channel of the heat exchanger 13, thus the idle mode in which the conversion apparatus 1 is not used for power generation or refrigeration is completed.

As discussed above, the conversion apparatus 1 is based on combination an organic Rankine cycle with ejector refrigeration for recycling the low-grade heat such as the industrial waste heat, the solar thermal heat and the geothermal heat. In the conversion apparatus 1, the heating module, the power generator module, the ejector, the heat exchanger, the condenser module, the low-temperature evaporator, the pump, the reservoir and the first and second direction controllable three-way valves are properly connected to one another. Through the heat exchanger, the residual heat of the medium-pressure gaseous working fluid at the outlet of the expansion turbine or ejector preheats the liquid working fluid at the inlet of the heating module, thus increasing thermal efficiency. Furthermore, the flow directions of the working fluid in the direction controllable three-way valves can be changed so that the power generation and refrigeration mode, the refrigeration mode, the power generation mode or the idle mode is executed. Thus, the low-grade heat can be used in multiple manners, and the energy can be utilized sufficiently. Thus, energy is saved, and the emission of the green house gas is reduced.

The present invention has been described through the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An apparatus for utilizing low-grade heat including:
  a heating module including:
    a boiler; and
    a heat source for energizing the boiler to vaporize liquid working fluid to high-temperature and high-pressure gaseous state;
  a power generator module including:
    an expansion turbine of which an inlet is connected to an outlet of the boiler; and
    a power generator coupled to the expansion turbine so that the high-temperature and high-pressure gaseous working fluid leaves from the boiler into the expansion turbine and drives the power generator for generating electricity wherein, after traveling through the expansion turbine, the working fluid becomes medium-temperature and medium-pressure gaseous working fluid;
  a low-temperature evaporator in which liquid working fluid absorbs heat, vaporizes, provides refrigeration, and becomes low-pressure gaseous working fluid;
  an ejector including a nozzle, a mixing section, a constant area section, a diffuser section, a suction port, an inlet and an outlet, wherein the inlet is connected to an outlet of the expansion turbine so that the medium-temperature and medium-pressure gaseous working fluid leaves from the expansion turbine and enters the ejector inlet to accelerate and become a low-pressure supersonic stream at the nozzle where the low-pressure supersonic stream then produces a high vacuum at the mixing section and sucks the low-pressure gaseous working fluid from the low-temperature evaporator through the suction port where the two streams mix together and become a supersonic mixed stream at the mixing section, and then enter the constant area section where, when going through the constant area section, a normal shock wave occurs, accompanied by a pressure where, after the shock, the velocity of the mixed stream becomes subsonic and decelerated at the diffuser section, and then out of the ejector outlet wherein, the ejector acts as a thermally derived gas compressor that utilizes medium pressure vaporized working fluid to compress low pressure gas, and is reliable for not containing any mechanical parts;
  a pressure pump;
  a heat exchanger comprising a hot channel of which an inlet thereof is connected to the ejector and a cold channel of which an inlet thereof is connected to the pressure pump such that the residual heat of the working fluid out of the ejector is recovered by preheating the liquid working fluid out of the pressure pump so that loads on the heating module and a condenser module are reduced, respectively;
  the condenser module including:
    an inlet of a condenser connected to a hot channel outlet of the heat exchanger so that the gaseous working fluid enters the inlet of the condenser through the hot channel of the heat exchanger, wherein an outlet of the condenser is connected to the low-temperature evaporator through a throttle so that a portion of the liquid working fluid selectively leaves from the condenser to the low-temperature evaporator; and
    a cooling tower for cycling a coolant through the condenser for condensing the gaseous working fluid to liquid working fluid;
  a reservoir connected to the condenser so that the reservoir receives any portion of the liquid working fluid from the condenser module not selectively directed to the low-temperature evaporator and contains the same;
  wherein the pressure pump is connected to the reservoir so that the ejector provides medium-pressure gaseous working fluid to preheat the liquid working fluid traveling from the pressure pump to reduce burdens on the heating module and the condenser module, wherein the pump is further connected to the heat exchanger so that while traveling to the boiler through the heat exchanger, the liquid working fluid gets heated and vaporized;
  a first direction controllable three-way valve provided between the boiler and the expansion turbine; and
  a second direction controllable three-way valve provided between the expansion turbine and the ejector, wherein the operation method of the apparatus is that the first and second direction controllable three-way valves, are operable to direct the working fluid in a selected one of various directions for executing all of a power generation and refrigeration mode, a refrigeration mode, a power generation mode, and an idle mode.

2. The apparatus according to claim 1, wherein the heat source is industrial waste heat, solar thermal heat or geothermal heat.

3. The apparatus according to claim 1, wherein the working fluid is an organic hydrocarbon, an inorganic small molecular compound or a chlorofluorocarbon, wherein the inorganic small molecular compound is $CO_2$ or $NH_3$.

4. The apparatus according to claim 1, wherein the first direction controllable three-way valve receives the gaseous working fluid from the boiler and directs the gaseous working fluid to the expansion turbine or the second direction controllable three-way valve.

5. The apparatus according to claim 1, wherein the second direction controllable three-way valve receives the gaseous working fluid from the expansion turbine or the first direction controllable three-way valve, and directs the gaseous working fluid to the ejector or the heat exchanger.

6. The apparatus according to claim 1, wherein in the power generation and refrigeration mode, the first direction controllable three-way valve directs the gaseous working fluid to the expansion turbine while the second direction controllable three-way valve directs the gaseous working fluid to the ejector so that the gaseous working fluid travels from the boiler to the expansion turbine through the first direction controllable three-way valve to generate electricity, and that the gaseous working fluid travels from the expansion turbine to the ejector through the second direction controllable three-way valve and then to the condenser through the heat exchanger, wherein the liquid working fluid travels from the condenser to the low-temperature evaporator to provide refrigeration and to the boiler through the heat exchanger and the pressure pump.

7. The apparatus according to claim 1, wherein in the refrigeration mode, the first direction controllable three-way valve directs the gaseous working fluid to the second direction controllable three-way valve while second direction controllable three-way valve directs the gaseous working fluid to the ejector so that the gaseous working fluid travels from the boiler bypassing the expansion turbine through the first direction controllable three-way valve to the ejector, and then to the hot channel of the heat exchanger and the condenser module, wherein a portion of the liquid working fluid enters the low-temperature evaporator to provide refrigeration and the other portion flows to the boiler through the pressure pump.

8. The apparatus according to claim 1, wherein in the power generation mode, the first direction controllable three-way valve directs the gaseous working fluid to the expansion turbine while the second direction controllable three-way valve directs the gaseous working fluid to the hot channel of the heat exchanger and the condenser module so that the gaseous working fluid travels from the boiler to the power generator module through the first direction controllable three-way valve for generating electricity power, and that the gaseous working fluid travels from the expansion turbine to the cold channel of the heat exchanger and then the condenser module through the second direction controllable three-way valve, bypassing the ejector, wherein the working fluid returns to the boiler through the pressure pump.

9. The apparatus according to claim 1, wherein in the idle mode, the first direction controllable three-way valve directs the gaseous working fluid to the second direction controllable three-way valve while the second direction controllable three-way valve directs the gaseous working fluid to the condenser module so that the gaseous working fluid travels from the boiler to the heat exchanger and then the condenser module through the first direction controllable three-way valve, bypassing the expansion turbine, and through the second direction controllable three-way valve, bypassing the ejector, wherein the working fluid returns to the boiler through the pressure pump.

* * * * *